United States Patent [19]
McGurl et al.

[11] Patent Number: 5,893,080
[45] Date of Patent: *Apr. 6, 1999

[54] DISBURSEMENT SYSTEM AND METHOD

[75] Inventors: Daniel M. McGurl, York; Margaret O'Toole, North Berwick, both of Me.; Helmar Herman, Lee; James L. Loomis, Durham, both of N.H.

[73] Assignee: Bottomline Technologies, Inc., Portsmouth, N.H.

[ * ] Notice: This patent issued on a continued prosecution application filed under 37 CFR 1.53(d), and is subject to the twenty year patent term provisions of 35 U.S.C. 154(a)(2).

[21] Appl. No.: 506,579

[22] Filed: Jul. 25, 1995

[51] Int. Cl.$^6$ ........................................... G06F 17/60
[52] U.S. Cl. .................. 705/40; 235/379; 340/825.3; 340/825.35; 705/35; 705/39
[58] Field of Search ........................ 395/230, 233, 395/234, 240; 705/30, 34, 33, 40, 410, 1, 35, 39; 221/9; 235/375, 379, 381; 340/825.3, 825.35

[56] References Cited

U.S. PATENT DOCUMENTS

| | | | |
|---|---|---|---|
| 4,385,285 | 5/1983 | Horst et al. | 382/119 |
| 4,484,307 | 11/1984 | Quatse et al. | 705/410 |
| 5,121,945 | 6/1992 | Thomson et al. | 283/58 |
| 5,193,055 | 3/1993 | Brown et al. | 705/33 |
| 5,283,829 | 2/1994 | Anderson | 380/24 |
| 5,383,113 | 1/1995 | Kight et al. | 395/240 |
| 5,394,469 | 2/1995 | Nagel et al. | 380/4 |
| 5,465,206 | 11/1995 | Hilt et al. | 395/240 |
| 5,504,677 | 4/1996 | Pollin | 705/45 |
| 5,570,465 | 10/1996 | Tsakanikas | 395/114 |
| 5,727,249 | 3/1998 | Pollin | 705/40 |
| 5,745,886 | 4/1998 | Rosen | 705/39 |
| 5,793,028 | 8/1998 | Wagener et al. | 235/380 |
| 5,799,087 | 8/1998 | Rosen | 380/24 |

*Primary Examiner*—Edward R. Cosimano
*Attorney, Agent, or Firm*—Hayes, Soloway, Hennessey, Grossman & Hage, P.C.

[57] ABSTRACT

A computerized payment disbursement system and method are provided. One embodiment of the method of the present invention includes storing in a computer database user-defined payment disbursement criteria associated with a plurality of types of disbursement transactions. At least one payment disbursement request corresponding to one of the plurality of types is received. At least one payment disbursement is generated based upon the criteria and the request by automatically determining which of the plurality of types corresponds to the request and automatically selecting from the storage means the disbursement criteria associated with that disbursement type.

25 Claims, 2 Drawing Sheets

DISBURSEMENT SYSTEM AND METHOD

BACKGROUND OF THE INVENTION

1. Field of the Invention

The present invention relates generally to a computerized disbursement system and method, and more specifically, to a computerized system and method for automatically effectuating at least one payment disbursement based upon user-defined disbursement criteria stored in a database and at least one disbursement request.

2. Brief Description of Related Prior Art

Computerized financial data processing and accounting systems are well known in the art. Typically, such systems permit the user to effectuate disbursements by e.g., printing checks and making payments via electronic funds transfers (EFT), monitor and balance bank accounts, and/or perform automated auditing and billing functions.

One prior art financial data processing system is disclosed in U.S. Pat. No. 5,121,945 to Thompson et al. The system disclosed in this patent automatically debits or credits multiple bank account records and accounts receivable records based upon customer payments. The system prepares integrated documents including an invoice and a check using a laser printer. Issuance of the document is based upon database tables with information including customer name and address, financial institution and account number, payee name and address, billing amount, accounts receivable account number, etc. Such data may be input manually or from other databases. The document is sent to the customer being invoiced, who fills out various sections of the front portion of the check, signs it, and returns it to the invoicer for cashing. The system also permits payment by EFT rather than check, via e.g., credit card, automated clearing house, automatic teller machine, etc. Access to database information may be protected by requiring entry of a password and/or security code information. The system also generates various accounting reports based upon the customer database information.

Another such system is disclosed in U.S. Pat. No. 4,385,285 to Horst et al. The patent discloses a check dispensing system for issuing checks from a terminal. The system includes an identification card reader for identifying an account number from which to draw funds for the check and a handwriting transducer from inputting identification data to determine whether the user is authorized to issue checks from the account number. The system also includes a keypad for inputting the desired amount of the check and bank data system for evaluating the current balance of the account and whether there are sufficient funds to issue the check for the amount requested. The system evaluates whether the signature provided via the transducer matches with an authorized signature on file and/or requests other authentication data, e.g., palm print, identification number, etc. If the system accepts the user's request to issue the check, the user then is prompted to input a payee code number to identify to whom the check is to be made payable. A printer prints the check.

Another prior art financial data processing system is provided by Intuit Corporation's QUICKEN 5™ financial management computer program. The QUICKEN 5™ program tracks user checking, savings, credit card, investment, and loan accounts. It also performs basic budgeting, financial planning, and audit report generating functions. It also includes check disbursement (from pre-printed check stock) and electronic bill paying functions.

Yet another prior art financial data processing system is provided by Bottomline Technologies, Inc., the assignee of the subject application, by the company's LASERCHECK® computer program. The company's LASERCHECK® computer program comprises a standalone check writing system which permits a user to produce a completed check on blank paper using MICR information. The company's LASERCHECK® computer program also performs basic accounting report generating functions and security while eliminating typing or handwritten checks.

Unfortunately, none of the aforesaid prior art permits fully automated payment disbursement according to user-predefined criteria, such as, disbursement financial account (e.g., bank or investment account number and type of account) and manner of payment (e.g., whether disbursement is to be made by hard-copy magnetic Ink Character Recognizable (MICR) negotiable instrument or by EFT) for different types of disbursements to be made (e.g., payments to suppliers, rebates, taxes, etc.), and individual disbursement requests (e.g., including such information as disbursement amount, intended payee, etc.). Additionally, none of the aforesaid prior art provides fully automated diagnostic means for monitoring whether the system is functioning properly and for preventing improper disbursements from taking place.

Other examples of prior art financial data processing systems and methods are disclosed in U.S. Pat. No. 5,283,829 to Anderson and U.S. Pat. No. 5,193,055 to Brown. These systems and methods also suffer from the aforesaid and/or other disadvantages of the aforesaid prior art.

OBJECTS OF THE INVENTION

It is therefore a general object of the present invention to overcome the aforesaid and other disadvantages of the prior art. More specifically, it is an object of the present invention to provide a computerized payment disbursement system and method wherein disbursements are made according to user-predefined criteria and user-supplied disbursement requests. It is also an object of the present invention to provide such a system and method wherein improper disbursements are prevented from occurring prior to their being made.

SUMMARY OF THE INVENTION

Accordingly, the present invention provides a computerized payment disbursement system and method that overcome the aforesaid and other disadvantages of the prior art. In broad concept, the system of the present invention essentially comprises computer database storage means for storing user-predefined payment disbursement criteria for a plurality of types of disbursement transactions. The system also includes means for receiving at least one disbursement request corresponding to one of the plurality of disbursement types. Additionally, means are provided for automatically generating a payment disbursement based upon the criteria and request. The generating means including means for automatically selecting from the storage means criteria corresponding to the disbursement type of the disbursement request.

One embodiment of the system of the present invention includes means for monitoring whether the system is functioning properly and for preventing improper disbursements from being effectuated.

One embodiment of the method of the present invention includes storing in a computer database user-defined payment disbursement criteria associated with a plurality of types of disbursement transactions. At least one payment disbursement request corresponding to one of the plurality of types is received. At least one payment disbursement is generated based upon the criteria and the request by automatically determining which of the plurality of types corresponds to the request and automatically selecting from the storage means the disbursement criteria associated with that disbursement type.

Advantageously, the present invention permits fully automated payment disbursement to be made according to user-predefined criteria and individual disbursement requests. Also advantageously, the present invention also prevents improper payment disbursement from being made.

These and other features and advantages of the present invention will become apparent as the following Detailed Description proceeds and upon reference to the Drawings wherein like numerals depict like parts, and in which:

It will be appreciated by those skilled in the art that although the following Detailed Description will proceed with reference being made to preferred embodiments, the present invention is not intended to be limited to these embodiments. For example, it should be understood from the outset that although preferably, the functional components of the preferred embodiment of the system of the present invention are embodied as one or more distributed computer program processes running on one or more conventional general purpose computers (e.g., IBM-compatible, Apple MACINTOSH,™ and/or RISC microprocessor-based computers), conventional telecommunications (e.g., modem and/or ISDN means), and MICR devices networked together by conventional network hardware and software, other types of computers and network resources may be used without departing from the present invention. Furthermore, it should be appreciated from the outset that one or more of the functional components may alternatively be constructed out of custom, dedicated electronic hardware and/or software, with departing from the present invention. Thus, the present invention is intended to cover all such alternatives, modifications, and equivalents as may be included within the spirit and broad scope of the invention as defined only by the hereinafter appended claims.

DETAILED DESCRIPTION OF PREFERRED EMBODIMENTS

Figure 1:
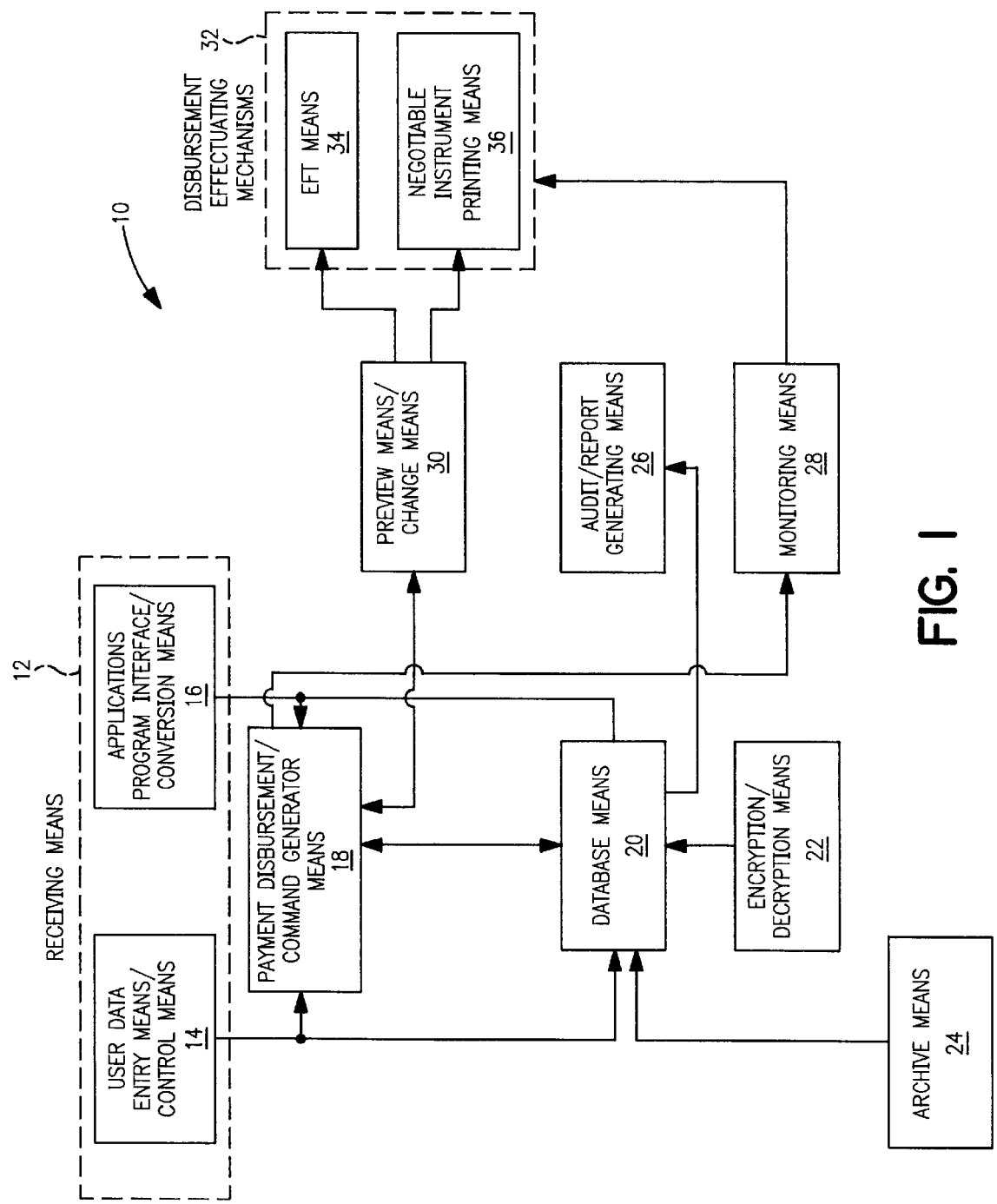
FIG. 1 is a block diagram of the functional components of one embodiment of the system of the present invention.
Figure 2:
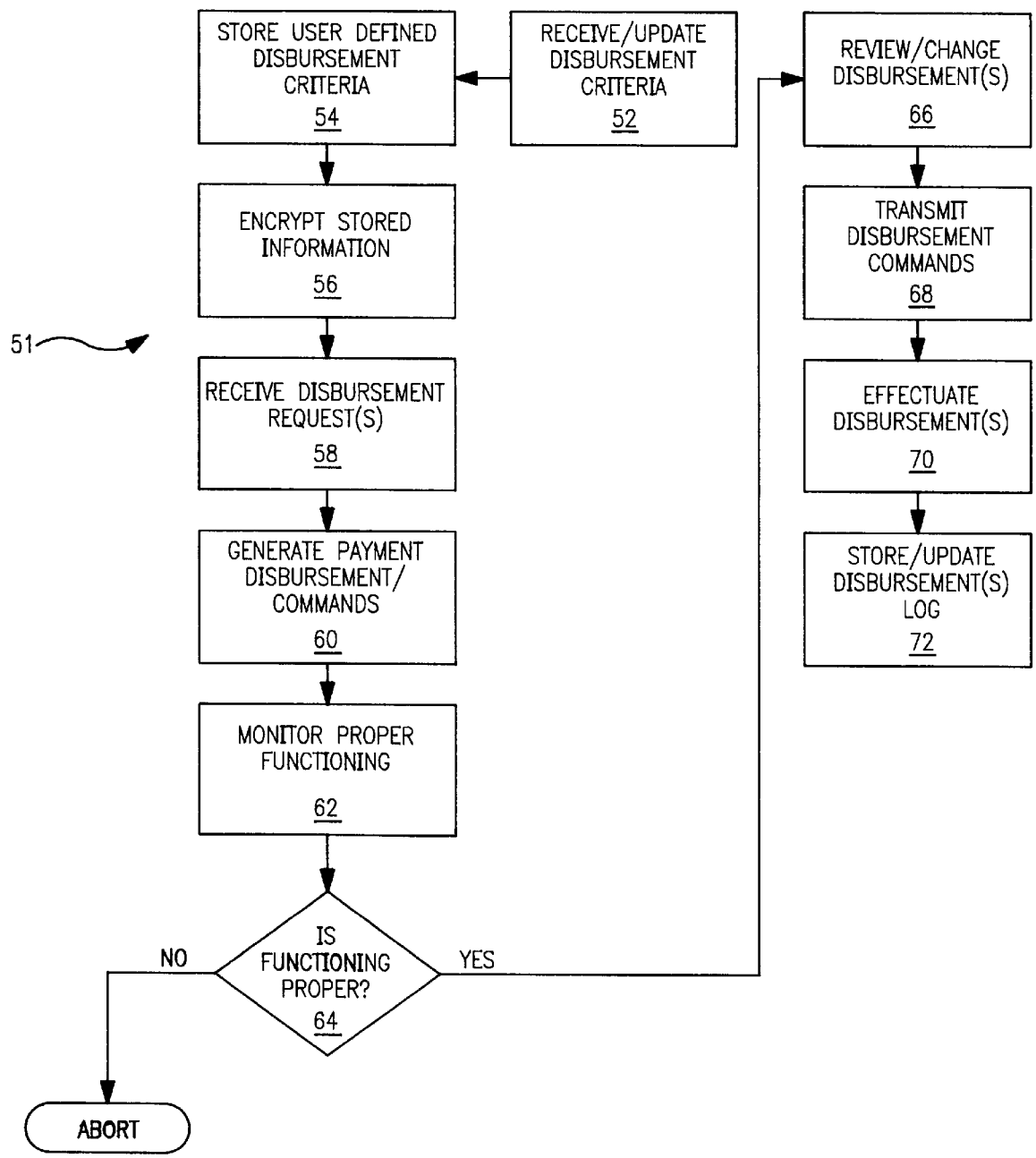
FIG. 2 is a block flow diagram of one embodiment of the process of the present invention.

Turning to FIGS. 1–2, preferred embodiments of the system and process of the present invention will now be described. Embodiment 10 comprises means 12 for receiving individual disbursement requests from conventional user data entry means/control means 14 and/or external application program interface/conversion means 16. Data entry means 14 preferably comprises a conventional graphical user interface running on a terminal screen and having a plurality of data fields for permitting entry of the data making up an individual disbursement request. Additionally, means 14 permits user control of the system, and access to information stored in the system, in the manner that will be described more fully below. Interface/conversion means 16 preferably takes information to be included in individual disbursement request from other systems (e.g., other application programs, such as accounting or financial database systems) and converts that information into a format usable by the system 10. As will be described more fully below, means 16 also receives and converts information from other systems to be included in disbursement criteria to be stored in the database 20.

Preferably, an individual disbursement request includes information related to the type and/or name of payee, amount of disbursement, payee group, etc. The request may also include the desired negotiable instrument, however, as will be described more fully below, if this information is not supplied and disbursement by negotiable instrument is desired, the user may command the system 10 to automatically determine what the next sequential negotiable instrument number should be, and to cause the negotiable instrument generated by the system 10 to have that number. Alternatively, the negotiable instrument generated may have no number.

Individual disbursement requests entered into the system 10 via the receiving means 12 are then transmitted to the payment disbursement/command generator means 18. Generator means 18 automatically generates an individual payment disbursement and commands for effectuating same based upon the individual disbursement request received by the receiving means 12 and user-predefined disbursement criteria stored in the database means 20. Preferably, the generator means 18 accomplishes this by automatically determining the type of the individual request by querying the database means 20 as to whether the payee name, type, and/or group data of the individual request received from receiving means 12 corresponds to disbursement criteria currently found in the database 20. If such correspondence is found to exist, the database means 20 transmits to the generator means 18 the disbursement criteria corresponding to the individual request. The generator 18 then uses the information transmitted from the database 20 and that from the individual request to generate control signals for permitting user preview of the disbursement by the preview means 30 and ultimately, effectuation of the disbursement by one or more effectuating mechanisms 32, as will be described more fully below. If such correspondence is not found to exist, the user may be prompted by the preview means 30 (which is described more fully below) to supply the missing information (i.e., the information that would have been supplied by the disbursement criteria had it been stored in the database means 20), which is then used by the generator 18 to generate the control signals.

Disbursement criteria are stored in database means 20. As discussed briefly above, in system 10, this is accomplished by entering the data for the criteria for each payee type (i.e., payee name and/or group) into the system 10 via the data entry means 14 and/or interface/conversion means 16. This information is then transmitted to and stored in the database means 20. Preferably, database means 20 comprises a conventional SQL-type relational database in which disbursement criteria are associated according to payee name, type, and/or group. Preferably, the disbursement criteria for each payee type includes the type and manner of disbursement desired (i.e., whether disbursement is desired by EFT or printed negotiable instrument) and the type of account from which disbursement is desired (e.g., bank or credit card account). Additionally, the disbursement criteria may also include endorsement signature and/or maker logo data for permitting the generator means 18 to generate appropriate commands for automatically effectuating disbursement of a negotiable instrument with a desired endorser's signature and graphic logo already printed onto the instrument.

Disbursement commands generated by the generator means 18 are transmitted to the user preview means 30, which preferably comprises a conventional graphical user interface display means on which is displayed the information for each payment disbursement generated by the system 10, prior to being effectuated by the system 10. Preview means 30 also includes conventional user input means for permitting the user to be able to make changes to the disbursements prior to their being effectuated by the system 10. Any change made to a disbursement causes the generator means 30 to generate new disbursement command signals based upon the changed disbursement information, which then displayed by preview means 30 to permit the user to preview the corrected disbursement, and to make further changes, if desired.

Once the user indicates to the system 10 (by e.g., selecting an appropriate option on the preview means graphical interface) that the disbursement is acceptable, the system 10 then effectuates the disbursement. Preferably, in system 10, this is accomplished by transmitting the disbursement commands generated by the generator means 18 to the disbursement effectuating means 32. Effectuating means 32 preferably comprises EFT effectuating means 34 and negotiable instrument printing means 36 for effectuating EFT disbursements and/or printed negotiable instrument disbursements, as determined by the disbursement criteria stored in the database means 20 (or supplied by the user via the preview means 30, in the manner discussed above) for each of the disbursement types. Preferably, EFT effectuating means 34 comprises conventional financial EDI and ACH means, and printing means 36 comprises one or more conventional MICR laser printer means. Of course, the types of EFT protocols and negotiable instrument forms supported by the means 34 and 36, respectively, are variable depending upon the particular needs of the user of the system 10 and the protocols supported by the institutions whose disbursement accounts are to be debited. Additionally, generator means 18 generates control signals appropriate for effectuation of the disbursements using means 34 and 36. After disbursement has been effectuated, the information used to generate the disbursement is stored in database means 20 for later retrieval, auditing, and/or use in reports generated by audit generating means 26, in the manner that will be described more fully below.

System 10 also includes encryption/decryption means 22. Means 22 encrypts information stored in the database means 20 to prevent access thereto by unauthorized personnel. The information stored in the database 20 may be retrieved into a user-readable form (via e.g., the audit means 26) by supply of a user-specified or predetermined password string to the system 10 via the entry means 14. Likewise, entry of disbursement requests to the system 10 may be prevented by preventing decryption of disbursement criteria stored in the database 20 by the rest of the system 10 unless the password is supplied to the system 10 via the entry means 14 prior to entry of the disbursement requests.

Data archive means 24 uses conventional data compression techniques to compress and archive infrequently used data stored in the storage means 20. This reduces the amount of storage space dedicated to storage of infrequently used data, thereby increasing the amount of space available for storage of other, more frequently used data.

Audit/report generating means 26 comprises conventional display and/or hard copy printing means (not separately shown) for generating disbursement and/or other financial reports based upon the disbursement information and criteria stored in the database 20. As noted above, unless an appropriate password is entered to the system 10 via the user control means 14, the information stored in the database means 20 remains encrypted, thereby preventing access to useful data by the audit generating means 26. Audit generating means 26 may also permit transmission to the institutions whose accounts are to be debited confirms of the disbursements whereby to permit so-called "positive pay" capabilities.

Finally, system 10 also comprises monitoring means 28 for monitoring the system 10 to ensure that the system 10 is functioning properly and that no improper disbursements are made. If a fault condition is determined to exist anywhere in the system 10, the monitoring means 28 prevents the effectuating mechanisms 32 from effectuating disbursements, and indicates the failure condition to the user by conventional means.

With reference being made to FIG. 2, one preferred embodiment 51 of the process of the present invention will now be described. Process 51 begins with the user inputting and/or updating disbursement criteria to the database means (as shown at block 52) via the receiving means 12. These criteria are then stored by the database means (see block 54) and encrypted (see block 56) by the encryption means 22. An acceptable password is then entered to enable access to the information stored in the database. One or more disbursement requests are then input to the system 10 by the receiving means 12 (see block 58). The generator means 18 uses the disbursement requests and the criteria stored in the database to generate the payment disbursements and effectuating commands (see block 60), in the manner described previously. Functioning of the system 10 is monitored 62 (as described above with reference to monitoring means 28, and if it is determined to be improper, disbursement is aborted, and the user is notified of the failure condition (see "NO" branch of block 64). If the system 10 is functioning properly (see "YES" branch of block 64), the user is then permitted to preview and change the disbursements by the preview means 30, if desired (see block 66). Assuming the disbursements are acceptable, the effectuating commands are transmitted to the effectuating mechanisms 32 (see block 68). The disbursements are then effectuated by the mechanisms 32 (see block 70). The disbursements are then stored in the disbursement log (not shown) of the database means 20 (see block 72).

Thus, it is evident that there has been provided a payment disbursement system and method that fully satisfy the aims and objectives hereinbefore set forth. It will be appreciated that although specific embodiments of the present invention have been presented, many modifications, alternatives, and equivalents thereof may be made without departing from the spirit and scope of the invention. Accordingly, the present invention is intended to cover all such alternatives, modifications, and equivalents as may be included within the spirit and broad scope of the invention as defined only by the hereinafter appended claims.

What is claimed is:

1. A computerized payment disbursement system, comprising:
   a. computer database storage means for storing user-defined payment disbursement criteria for a plurality of types of disbursement transactions, including an EFT type disbursement transaction;
   b. means for receiving at least one disbursement request, said request corresponding to one of said plurality of types;
   c. means for automatically generating a payment disbursement based upon said criteria and request, said generating means including means for automatically selecting from said storage means criteria corresponding to said one type; and d. automated diagnostic means for automatically determining whether a system failure condition exists, said diagnostic means also being for automatically preventing said EFT type disbursement transaction, if said system failure condition is determined to exist, and for automatically indicating to a user of said system existence of said system failure condition.

2. A system according to claim 1, wherein said means for receiving said disbursement request includes means for generating a graphical user interface for permitting a user to input said request to said system.

3. A system according to claim 1, wherein said means for receiving said disbursement request includes program interface means for receiving disbursement request-related data from a computer program and for converting said request-related data into said request.

4. A system according to claim 1, and further comprising, means for encrypting information stored in said system.

5. A system according to claim 1, and further comprising, means for generating a user-understandable audit report of information stored in said system.

6. A system according to claim 1, and further comprising, means for storing data related to said payment disbursements.

7. A system according to claim 1, wherein said criteria comprises disbursement account information and manner of payment information.

8. A system according to claim 1, wherein:
  a. said at least one request comprises a plurality of requests corresponding to at least certain ones of said types of disbursements; and
  b. said generating means is for generating a plurality of payment disbursements based upon said plurality of requests and said criteria by automatically determining which of said plurality of types corresponds to said certain ones and automatically selecting from said storage means disbursement criteria associated with said certain ones.

9. A system according to claim 1, wherein said generating means is also for generating commands for effectuating said payment disbursement.

10. A system according to claim 9, wherein said generating means is also for transmitting said commands to payment disbursement mechanisms for effectuating said payment disbursement.

11. A system according to claim 1, wherein said generating means is also for generating and transmitting disbursement commands to EFT and negotiable instrument generating means.

12. A system according to claim 11, wherein said negotiable instrument generating means includes a printer and said commands data includes commands for causing said printer to generate at least one check having MICR characters.

13. A method for making payment disbursements via a payment disbursement system, comprising:
  a. storing in a computer database storage means user-defined payment disbursement criteria associated with a plurality of types of disbursement transactions, including an EFT type disbursement transaction;
  b. receiving at least one payment disbursement request corresponding to one of said plurality of types;
  c. generating at least one payment disbursement based upon said criteria and said request by automatically determining which of said plurality of types corresponds to said request and automatically selecting from said storage means disbursement criteria associated with said one type; and
  d. automatically determining whether a payment disbursement system failure condition exists, and if said system failure condition is determined to exist, automatically preventing said at least one payment disbursement of said EFT type from being effectuated and automatically indicating to a user of said system existence of said system failure condition.

14. A method according to claim 13, and further comprising, changing criteria stored in said storage means.

15. A method according to claim 13, and further comprising, storing said at least one request in said storage means.

16. A method according to claim 13, and further comprising, encrypting said criteria and said request.

17. A method according to claim 13, wherein said receiving of said request includes receiving disbursement request-related data generated by a user application program and converting said request-related data into said request.

18. A method according to claim 13, and further comprising, determining whether said at least one payment disbursement is improper, and if said at least one payment disbursement is determined to be improper, automatically preventing said at least one payment disbursement from being effectuated and automatically indicating to said user prevention of the payment disbursement determined to be improper.

19. A method according to claim 13, and further comprising, generating an audit report based upon said criteria and said request.

20. A method according to claim 13, wherein said criteria includes disbursement account information and manner of payment information.

21. A method according to claim 20, and further comprising:
  a. generating payment disbursement data based upon said request, said account information, and said manner of payment information; and
  b. transmitting said disbursement data to at least one mechanism for effectuating said requested disbursement.

22. A method according to claim 21, wherein said at least one mechanism comprises EFT and negotiable instrument generating means.

23. A method according to claim 13, wherein:
  a. said at least one request comprises a plurality of requests corresponding to at least certain ones of said types of disbursements; and
  b. said generating of said at least one payment disbursement including generating a plurality of payment disbursements based upon said plurality of requests and said criteria by automatically determining which of said plurality of types corresponds to said certain ones and automatically selecting from said storage means disbursement criteria associated with said certain ones.

24. A method according to claim 23, and further comprising, transmitting commands for effectuating said payment disbursements to EFT and negotiable instrument generating means.

25. A method according to claim 24, wherein said negotiable instrument generating means comprises a printer and said commands cause said printer to generate at least one check having MICR characters.

* * * * *